United States Patent [19]
Wagner

[11] Patent Number: 5,471,885
[45] Date of Patent: Dec. 5, 1995

[54] SELF-CONTAINED DIGITAL ELECTRONIC FORCE GAGE WITH INTERCHANGEABLE FORCE SENSOR MODULES

[76] Inventor: William B. Wagner, P.O. Box 1217, Greenwich, Conn. 06836-1217

[21] Appl. No.: 105,370

[22] Filed: Aug. 11, 1993

[51] Int. Cl.[6] .................................................. G01L 1/00
[52] U.S. Cl. .............................. 73/862.041; 73/862.541; 73/431
[58] Field of Search ...................... 73/862.041, 862.381, 73/862.541, 862.56, 862.542, 862.621, 862.634, 431

[56] References Cited

U.S. PATENT DOCUMENTS 3,754,438  8/1973  Matson ............................... 73/862.634

OTHER PUBLICATIONS

Ametek, Inc. Brochure on Accuforce III Digital Force Gage.
Ametek, Inc. Bulletin TA–201 on Accuforce GM Digital Force Gage.
Ametek, Inc. Catalog, p. 8, Accuforce Cadet Force Gage.
John Chatillon & Sons, Inc. Brochure on Model DFGRS/DGGRS.
John Chatillon & Sons, Inc. Brochure on Model DRC.
John Chatillon & Sons, Inc. Brochure pp. 7–8 on Model DFGS–R and Model DFI.
Imada Co., Ltd Digital Force Gage Brochure.
Mark–10 Corporation Brochure on Series BG Digital Force Gage.
Mecmesin, Inc. Digital Force Gage Brochure.
Shimpo Handheld Force Gages Catalog 700.
Wagner Instruments Catalog, pp. 12–23.
Weigh–Tonix, Inc. Brochure.

*Primary Examiner*—R. Raevis
*Attorney, Agent, or Firm*—Ware, Fressola, Van Der Sluys & Adolphson

[57] ABSTRACT

An apparatus for measuring compressive and tensile forces over extended incremental ranges of force loads utilizing freely interchangeable pre-calibrated force sensors (load cells) of various capacities each mounted integrally and permanently in a force cell module or housing which readily attaches and detaches to a force display module. The force display module employs an electronic microprocessor circuit to process the signal from the force sensor and to display the signal in units of force on an electronic display (liquid crystal display). The two modules comprise the complete self-contained digital electronic force gage (dynamometer) with all components mounted internally. The gage can be utilized as a hand-held unit or on a test stand or test fixture.

49 Claims, 4 Drawing Sheets

SELF-CONTAINED DIGITAL ELECTRONIC FORCE GAGE WITH INTERCHANGEABLE FORCE SENSOR MODULES

BACKGROUND OF THE INVENTION

1. Field of the Invention

The present invention relates to an apparatus for measuring compressive and tensile forces over extended ranges of force loads utilizing freely interchangeable pre-calibrated force sensors (load cells) of various capacities.

2. Description of the Prior Art

There is no physical phenomenon which directly converts a force into an electrical signal. Therefore, in a force transducer, the force is first converted into a strain (deflection) in an elastic material and in turn this strain is converted into an electrical signal. Utilizing this concept, current strain gage technology provides a strain gage load cell widely used in force measuring and weighing instruments. The load cell is a precisely machined metal strain member to which electronic strain gages are cemented. When force is applied to the metal member, the member is caused to deflect and the electrical resistance of the strain gage changes, which makes it possible to relate the strain (deflection) to the applied force.

In prior art devices, a Wheatstone Bridge circuit, of which the strain gage is a part, is used whereby the output signal of the strain gage load cell is processed by an electronic circuit—detected, amplified and converted from analog to digital format—and visually displayed in units of force on the electronic (LCD or LED) display screen. Such prior art devices, commonly referred to as digital electronic force gages, were first introduced in the 1960's. They generally comprise a metal or plastic housing containing an electronic strain gage force sensor (load cell) dedicated or matched in force capacity to the individual force gage (dynamometer) and an electronic control and processing circuit (printed circuit board) with a digital electronic display (LCD or LED) mounted integrally and battery for power.

The prior digital electronic force gages utilize an electronic strain gage load cell individually calibrated and permanently mated to one electronic control and processing circuit and digital electronic display. The electronic circuit is then adjusted to accommodate the coarse tolerance by adjusting a potentiometer while calibrating the electronic force measuring device with dead weights. Therefore, it is only necessary to control the tolerance of the strain gage load cell output—expressed in millivolts/volts of excitation voltage—to a relatively coarse 5% or more. Because the tolerance of the strain gage load cell is relatively coarse, the cost of manufacture of the strain gage load cell is lower and thus the cost of manufacture of the prior art devices is more economical, but requires the permanent mating of a particular strain gage load cell to a particular electronic control and processing circuit.

Since the accuracy of force measuring instruments is controlled to and expressed as a percentage of the full scale capacity of the particular force gage, the need to change from a force gage with one designated capacity to another force gage with another capacity is apparent as follows:

Force Gage Number 1:
Capacity: 100 pounds force (lbf.)
Accuracy: ±0.2% of full scale
Maximum allowable error: 100×0.002=±0.2 lbf.
Force Gage Number 2:
Capacity: 10 pounds force (lbf.)
Accuracy: ±0.2% of full scale
Maximum allowable error: 10×0.002=±0.02 lbf.

Thus, when measuring forces of 10 lbf. or less, the obvious choice of force gages would generally be Force Gage Number 2 with a maximum possible error of ±0.02 lbf. versus Force Gage Number 1 with a maximum possible error of ±0.2 lbf., which is 10 times greater error.

The dedicated or permanently matched system has the drawback that, when a higher or lower capacity force gage is required to enhance (improve) readability and/or accuracy, the user must acquire an additional complete force gage. When several force gages of various capacities or measuring ranges are required, the physical size and weight becomes a factor for transporting and storing the several instruments. More importantly, with the acquisition of additional force gages, the cost includes all the components of a complete force gage. With each purchase the user must acquire another redundant electronic control and display circuit, which is the most costly component of the force gage.

Another "prior art" digital; electronic force gage generally utilizes all the same component parts as other prior art force gages, but the strain gage load cell is mounted externally to the force gage housing and remotely on an electrical cable to facilitate reading force measurements at a distance from the forces being measured. The force gage can be utilized as either hand-held or mounted on a test stand or test fixture. This remote load cell force gage is either (1) dedicated, permanently matched force sensor to the electronic control and display circuit, or (2) interchangeable, controlled output load cell allowing any one of several remote load cells to be attached to the force gage for use without calibration on site with dead weights. The force measuring capabilities of this remote force gage are generally limited to unique applications where the remote force measuring feature is needed, i.e., the remote load cell may be inserted between two surfaces exerting compression forces or between two objects moving apart and exerting tensile forces. In these applications, the force gage with remote dedicated or interchangeable load cells is very useful, but is limited by its remote load cell configuration.

The present invention is designed to overcome the above limitations that are attendant upon the use of "prior art" devices, and toward this end, it contemplates the provision of a novel method and apparatus for measuring force quantities, which utilizes a self contained digital electronic force gage with interchangeable strain gage load cells, in the form of force cell modules, of various force capacities or measuring ranges.

It is an object to provide such a device which eliminates the redundancy in force gages, that requires an additional electronic control and display circuit for each force capacity or force measuring range.

It is also an object to provide such a device which has precalibrated interchangeable force cell modules of various force measuring ranges that readily attach to the force display module, but do not require calibration to complete the mating of the force sensor (load cell) to the electronic control and display circuit and battery (the force display module).

Still another object is to provide such a device which can be completely self-contained and yet has interchangeable force sensor modules that become integral to the complete assembly to become a force gage of another force capacity or measuring range.

Still another object is to provide such a device with significant financial savings for the end user, in that the same technical measuring result, the basic intended use of such an instrument, is the same at lower overall costs when there is a need for multiple force measuring ranges.

A further object is to provide, conversely, a device that offers interchangeability of the electronic control and display circuit and battery (the force display module) to the end that repair of the force gage is facilitated by the end user, e.g. the cost of having both force display modules and force cell modules as stand-by spares is significantly less than the cost of complete spare force gages.

Another object is to provide such a device which is generally compatible in physical size, form and configuration with "prior art" devices, to be readily adaptable for the same use without disadvantage.

It is a general aim of the invention to provide such a device which may be readily and economically fabricated and will have long life in operation and significantly greater flexibility in use.

SUMMARY OF THE INVENTION

It has now been found that the foregoing and related objects can be readily attained in a force gage apparatus for measuring compressive and tensile forces over several incremental ranges of force loadings utilizing freely interchangeable modules having precalibrated load cells of various capacities. Each load cell is mounted integrally and permanently in its module which readily attaches and detaches to a control and display module. The control and display module employs an electronic microprocessor circuit to process the signal from the load cell and to display it on an electronic digital display in units of force.

Desirably, the electronic control, processing and display circuit detects a change of force level signal (output) from a force sensor (load cell), amplifies the signal (output), converts the signal (output) into a digital signal and displays the force level (digital signal) as numerals on the electronic display screen in units of force. Numerous variations of this basic method may be employed to enhance the results. As technology advances, other enhancements will evolve but the basic functions (namely, signal detection, amplification, conversion to digital signal and display, of the control and display circuit) will remain unchanged.

Conveniently, the force gage apparatus of the present invention can be mounted vertically on a force test stand. In such an arrangement, a force receiving member, i.e., a threaded implement shaft, which is attached directly to the strain gage load cell, points in the downward direction. The present invention permits this orientation of the force receiving member, while the display can be read in an upright orientation by providing a quick disconnect electrical connector between the force display module and the force cell module.

Alternatively, the force gage of the present invention can be held in the hand of the user. This requires the force receiving member to point in the outward direction away from the user. The force receiving member can be quickly reorientated by utilizing the quick disconnect electrical connector between the force display module and the force cell module thereby permitting the display to be read in an upright orientation.

To permit the desired reorientation of the force receiving member in relationship to the force display screen, the quick disconnect electrical connector that electrically mates the force display module to the force cell module is intentionally designed to permit 180° reversibility of the force cell module in relationship to the force display module. Thus, the force display continues to display in an upright manner for the user's convenience, whether the force receiving member is pointing upwards or downwards.

The invention will be fully understood when reference is made to the following detailed description taken in conjunction with the accompanying drawings.

DETAILED DESCRIPTION OF THE INVENTION

Figures 1, 2:
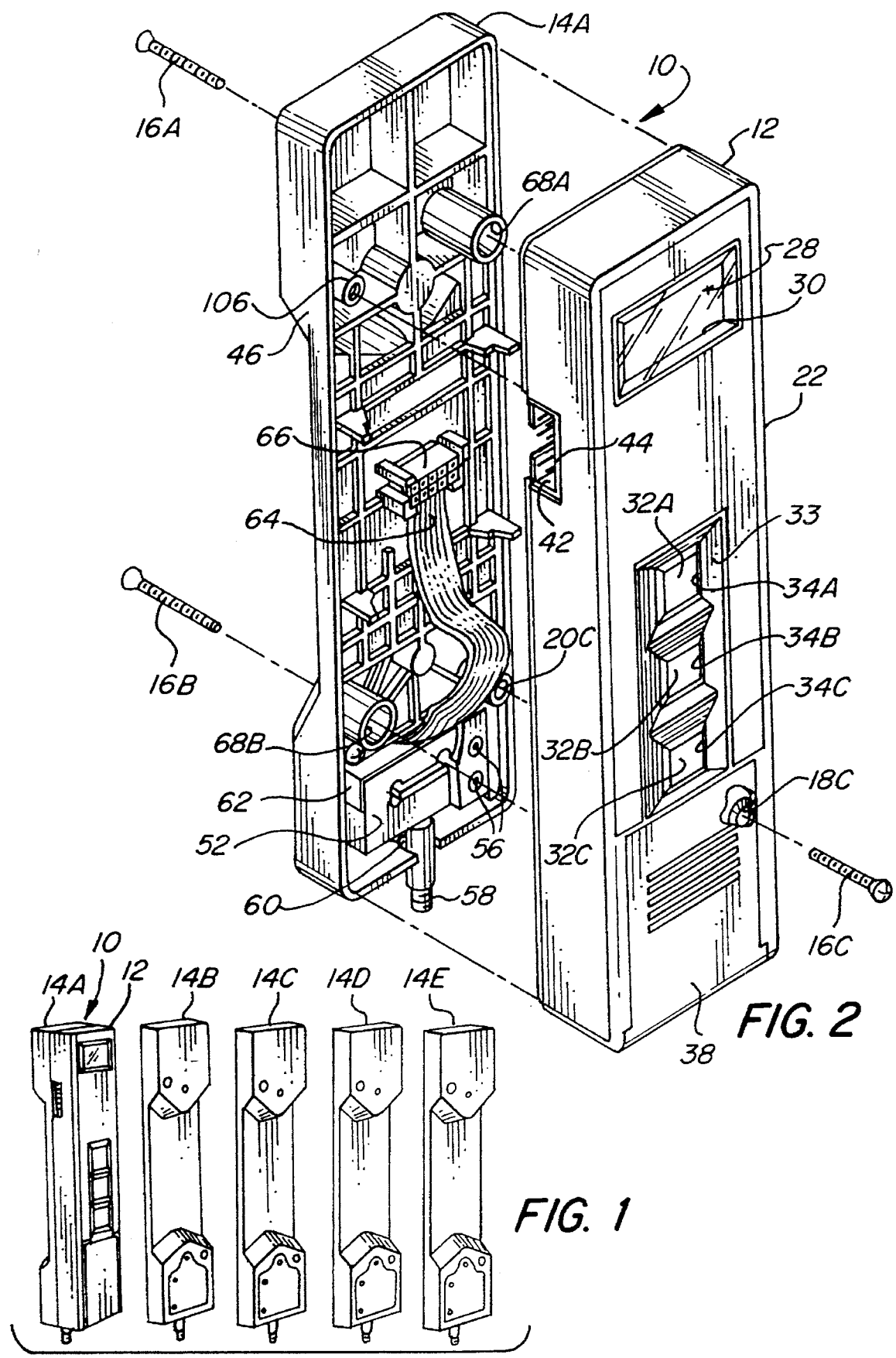
FIG. 1 is a perspective view of a force gage kit of the present invention with an assembled force cell module/force display module forming the complete digital electronic force gage and of four extra interchangeable force cell modules.
FIG. 2 is an exploded perspective view of the force gage.
Figure 3:
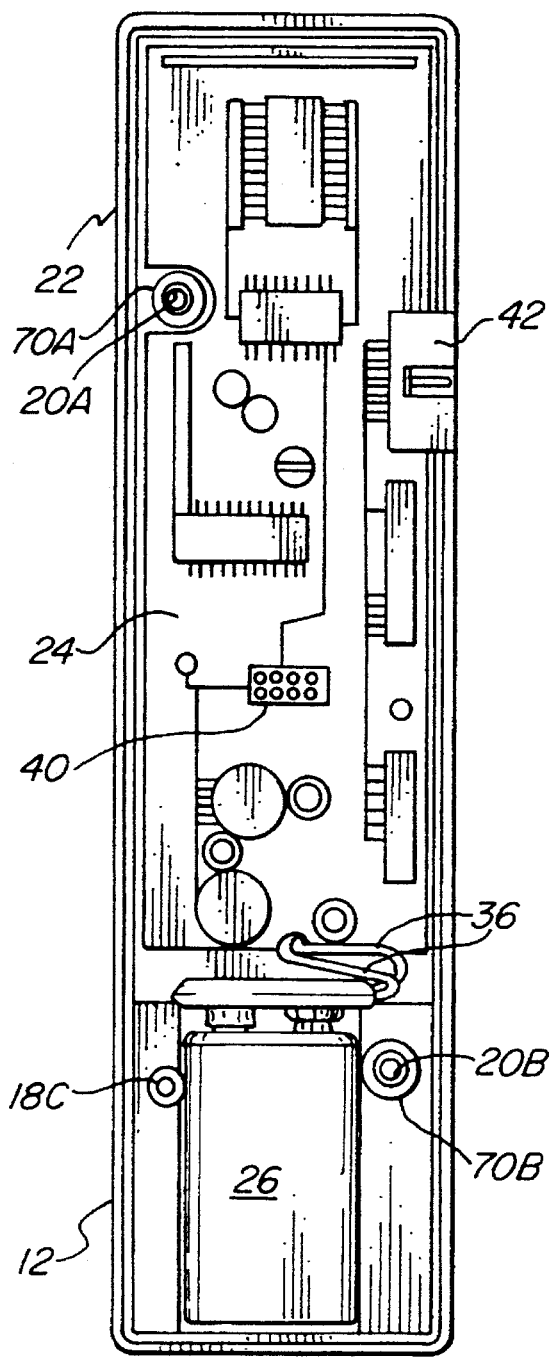
FIG. 3 is an elevational view of the force display module depicting the electronic control and processing printed circuit board with the module interface connector and the battery.
Figure 4:
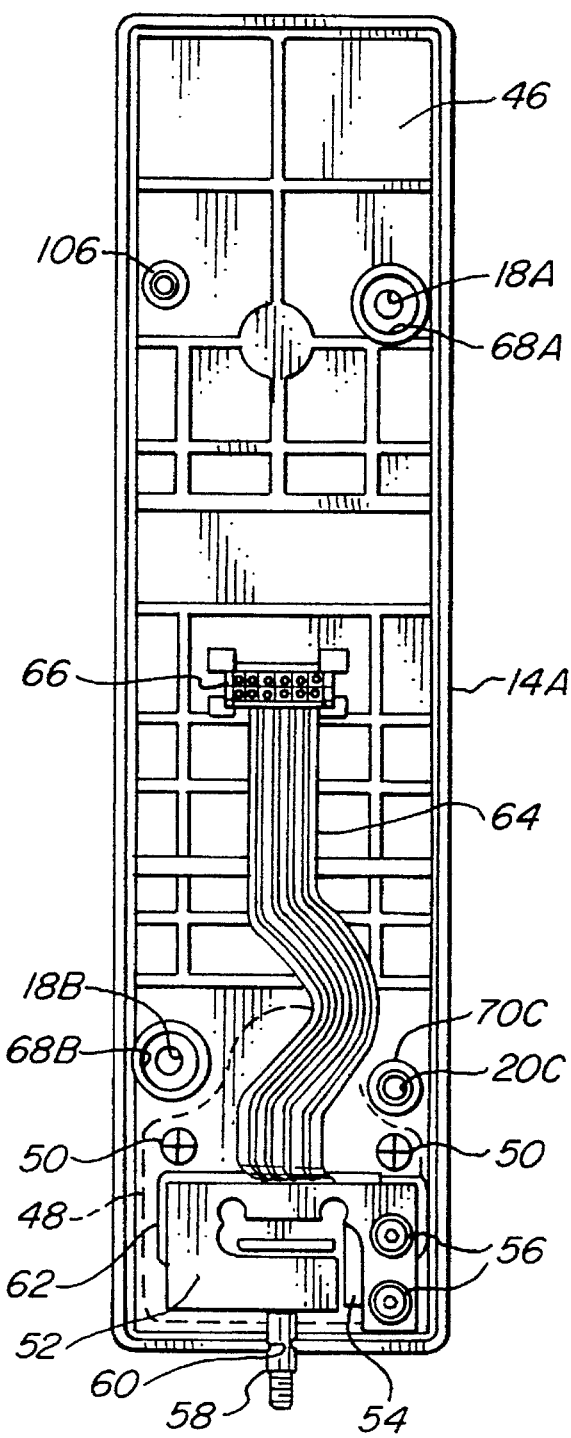
FIG. 4 is an elevational view of the force cell module depicting the force sensor (load cell) with the flexible cable that attaches the force sensor (load cell) to the female module interface connector.

Turning first to FIG. 1 of the drawings, therein illustrated is a self-contained digital electronic force gage device generally designated by the numeral 10. The device 10 is comprised of a force display module 12, which is the front portion of the force gage 10, and a force cell module 14A, which is the rear portion of the force gage 10 and has a measuring capacity of five (5) pounds. Referring to FIGS. 2 and 3–4, the force cell module 14A is detachable from the force display module 12. The attachment of the two modules 12, 14A is accomplished with three screws 16A, 16B, 16C mating with clearance holes 18A, 18B, 18C and threaded holes 20A, 20B, 20C. Four additional force cell modules 14B–14E of different capacities (10, 30, 50, 100 pounds) are also illustrated in FIG. 1 and are interchangeable with the force cell module 14A in a manner explained further hereinafter.

Referring again to FIGS. 2 and 3, the force display module 12 comprises a molded plastic housing 22 with an electronic control and processing circuit board 24 and 9-volt battery 26 mounted therein. An electronic digital display screen 28, which can be a liquid crystal display, is operationally connected with and is located on an inner side (not shown) of the electronic control and processing printed circuit board 24 and is visible through an aperture 30 in the housing 22 as shown on FIG. 2. Similarly, three control panel buttons (ZERO/SCROLL button 32A, PEAK/SELECT button 32B, POWER/ESCAPE button 32C) forming a keyboard control panel 33 are operationally connected to and are located on an inner side of the electronic control and processing printed circuit board 24 and extend through apertures 34A, 34B, 34C in the housing 22 as shown in FIG. 2. The battery 26 is a self-contained power source and is connected to the electronic control and processing printed circuit board 24 by electrical leads 36. A battery panel 38 is slidably received in the housing 22 to facilitate access to the battery 36 when the force gage 10 is fully assembled. Extending from and electrically connected to the electronic control and processing printed circuit board 24 is a male module interface connector 40 which is centrally located relative to the housing 22. A male computer output interface connector 42 extends from the electronic control and processing printed circuit board 24 and through aperture 44 in the housing 22 shown in FIGS. 2 and 3.

Turning now to FIGS. 2 and 4, the force cell module 14A has a molded plastic housing 46 with a metal load cell mounting plate 48 (shown in dotted line in FIG. 4) mounted on an outside or back surface thereof by a pair of screws 50 which extend through the housing 46. A load cell 52 is seated at one end of the housing 46 on a raised land portion 54 thereof and is mounted in a cantilevered fashion to the load cell mounting plate 48 by screws 56 extending through the land portion 54 of the housing 46. The load cell 52 has a force receiving member 58 which extends through an aperture 60 in the housing 46 and is threaded to receive a variety of implements. The load cell 52 is a precisely machined metal strain member with electronic strain gages 62 cemented thereon. Electrically connected to the electronic strain gages 62 is a flexible ribbon-type electrical cable 64 which is also electrically connected to a female module interface connector 66 centrally located on the housing 46. The female module interface connector 66 is designed to mate with the male module interface connector 40 of the force display module 12.

In assembling the force display module 12 and force cell module 14A of the force gage 10 as shown in FIG. 2, it should be readily appreciated that the clearance holes 18A, 18B are recessed in sockets 68A, 68B dimensional sized to accept raised extension portions 70A, 70B in which the threaded holes 20A, 20B are located. Insertion of the raised extension portions 70A, 70B in the sockets 68A, 68B precisely aligns the force display 12 relative to the force cell module 14A and also aligns the male module interface connector 40 relative to the female module interface connector 66 to achieve appropriate electrical connection therebetween whereby forces applied to the load cell 52 will be electronically transmitted to the electronic control and processing printed circuit board 24.

Figure 5:
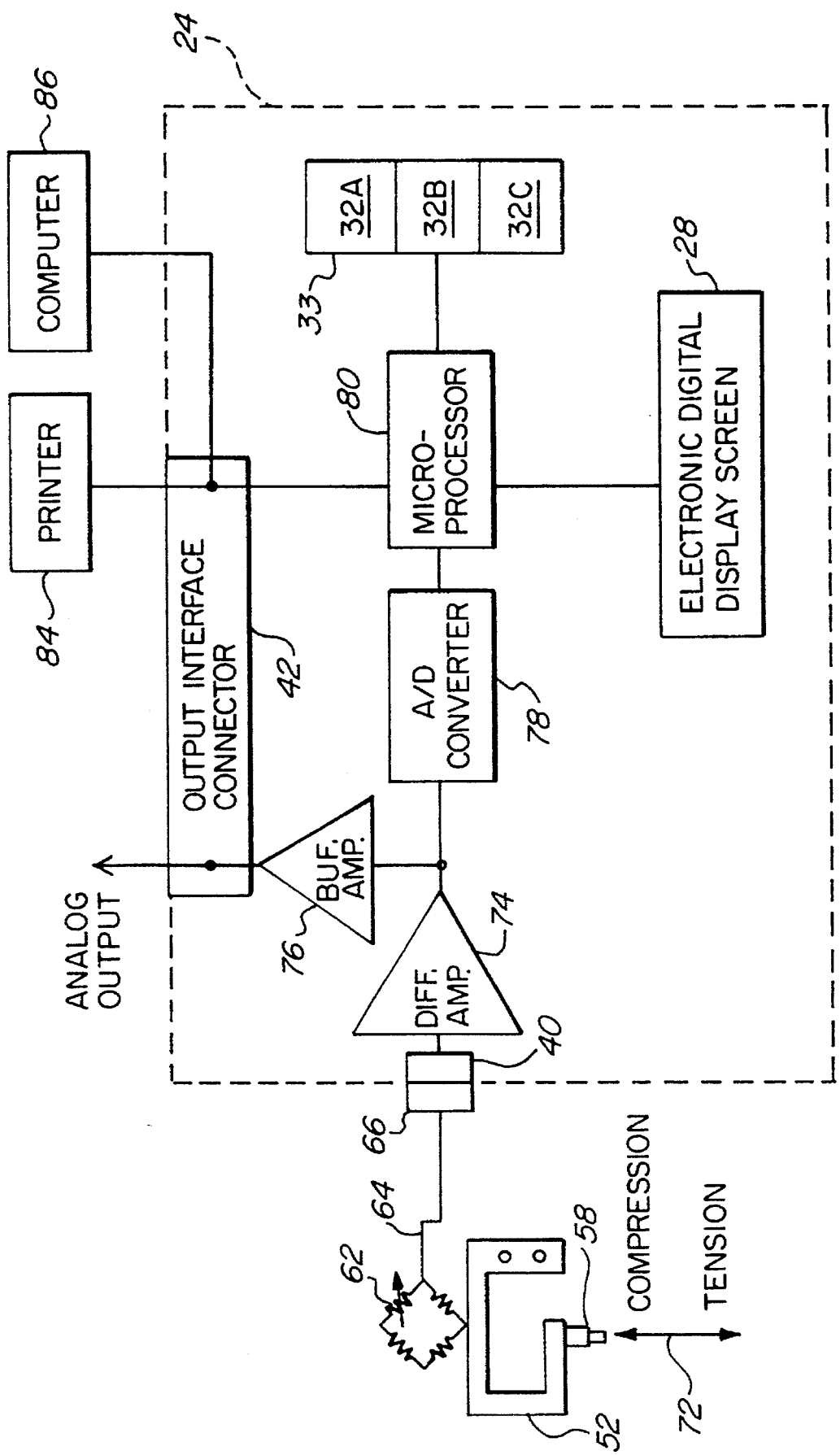
FIG. 5 is a block diagram of the electronic control and processing circuit with the electronic strain gage load cell and an auxiliary printer and computer.

Referring to FIG. 5, the operation of the electronic control and processing printed circuit board 24 of the force gage 10 will be readily apparent to the artisan skilled in the art. Pushing or pulling on the load cell 52 caused by tension or compression illustrated by arrow 72 produces a positive or negative voltage across the electronic strain gages 62 which is amplified by a differential amplifier 74. The output of the differential amplifier goes into both a buffer amplifier 76 and a 15-bit analog to digital (A/D) converter 78. The output of the buffer amplifier 76 is available on the interface connector 42 for direct measurements by analog recording devices, such as strip chart recorders and X-Y plotters (both not shown). The A/D converter 78 converts the force measured by the load cell 52 into a digital signal for a microprocessor 80. The microprocessor 80 is a programmable 8-bit microprocessor, running at 3.5795 MHz with an internal sampling rate of over 100 times per second and is programmed to function as described hereinafter. The microprocessor 80 converts the force measurements into pounds, kilograms, or Newtons. The user controls the force gage 10 using the control panel buttons 32A, 32B, 32C on the user keyboard control panel 33. Force and unit status is displayed on the electronic digital display screen 28. Load cell force measurements are also output via the male output interface connector 42 for display on an optional auxiliary printer 84 or an optional auxiliary computer 86.

The following covers the basic operation of the force gage 10, allowing the user to immediately begin testing with the force gage 10. Pressing the POWER/ESCAPE button 32C activates the force gage 10. If the display does not light, or the low battery indicator on the electronic digital display screen is lit, then the battery is unable to sufficiently power the instrument and must be replaced. Pressing the POWER/ESCAPE button 32C again deactivates the force gage 10. If the gage has not been used (i.e. no buttons have been pressed) for a period of time equal to the user selectable automatic shutoff time, then the gage will shut off automatically. All user defined functions remain stored in nonvolatile memory in the microprocessor 80 while the gage 10 is shut off.

With the gage 10 oriented in the same position as it will be during testing, pressing the ZERO/SCROLL button 32A automatically tares out the weight of any attachment or accessory on the force receiving member 58, sets the electronic digital display screen 28 to zero, and clears all peak readings. Although any weight or force up to 100% of the load cell capacity can be tared out, the net capacity of the gage 10 will decrease if the tare is more than 50% of the load cell nominal capacity:

NET CAPACITY=150% NOMINAL CAPACITY−TARE

While the force gage 10 is displaying the current applied force (i.e. the gage is not displaying a peak value), the electronic digital display screen will display a "C" if the applied force is a compression force and a "T" if the applied force is a tension force.

During operation, the microprocessor 80 keeps track of both the peak tension and peak compression forces read by the gage 10, allowing both peaks to be captured during a single test. The user can choose between displaying one of these peak readings or the current applied force by using the PEAK/SELECT button 32B. Pressing the PEAK/SELECT button 32B rotates through the displayable values: current applied force, peak compression reading, peak tension reading. If the reading that is currently being displayed is a peak reading, then the "PEAK" indicator will be lit on the electronic digital display screen 28. In addition, a peak compression reading will have the "C" indicator lit and the peak tension reading will have the "T" indicator lit. Pressing the ZERO/SCROLL button 32A clears the peak readings for a new test and also rezeros the gage. The previously used peak mode is maintained after clearing the peak readings.

The force gage 10 has a variety of features available to the user. The selection of many of these features needs only be performed once per test, application, or during the life of the gage 10. Therefore, these options are selected through the Set-Up Menu.

The Set-Up Menu is a two level menu. At the top level are the menu options that can be set by the user. Within each of these options are the values that can be selected for that option. The table below summarizes the menu options and their selectable values.

| MENU OPTION | SELECTABLE VALUES |
| --- | --- |
| Units (unit) | LB, KG, N |
| Automatic Shut-Off | 0, 1, 5, 10, 20, 30 minutes |
| Digital Filter | |
| Peak: | Average of 1, 2, 4, or 8 samples |
| Current: | Average of 1, 2, 4, or 8 samples |
| Calibration | Auto-Calibration |
| Computer Output | Enabled or Disabled |
| Printer Output | Enabled or Disabled |
| Load Cell | 5, 10, 30, 50, 100 LB |

To Access the Set-Up Menu, the following steps are performed:

1. Turning the gage 10 off using the POWER/ESCAPE button 32C.
2. Pressing and holding the PEAK/SELECT button 32B.
3. Turning the gage 10 on using the POWER/ESCAPE button 32C.
4. Releasing the PEAK/SELECT button 32B. The software version number will be displayed to confirm that the gage 10 is in the Set-Up Menu.

The ZERO/SCROLL button 32A is used to step through the menu options and the selectable values. The PEAK/SELECT button 32B is used to select the currently displayed menu option or selectable value. The POWER/ESCAPE button 32C is used to exit the Set-Up Menu, without saving any changes.

After entering the Set-Up Menu, the ZERO/SCROLL button 32A is used to step through the menu options. When an option that is required to be changed is displayed, the PEAK/SELECT button 32B is pressed to choose that option. The presently set value for that option is first displayed. To step through the selectable values, the ZERO/SCROLL button 32A is used. When the desired value is displayed, the PEAK/SELECT button 32B is pressed. The display will read "done" to show that a change has been made, but the change has not yet been saved. If all selectable values have been stepped through without the PEAK/SELECT button 32B having been pressed, the gage 10 will return to the Set-Up Menu while retaining the presently set value.

To save the change without changing any other values, the PEAK/SELECT button 32B is pressed so the gage 10 returns to normal operation. If other changes need to be made, the ZERO/SCROLL button 32A is pressed instead and the appropriate previously recited steps are repeated to make the necessary changes. To exit the Set-Up Menu at any time without saving any changes, the POWER/ESCAPE button 32C is pressed to return the gage 10 to normal operation.

The following menu options are available to the user:

1. Units (unit)

The user has the option of displaying the force readings in pounds, kilograms, or Newtons. During normal operation, the units are displayed on the electronic digital display screen 28. To change the units, the units sub-menu is entered and the preferred unit setting chosen.

2. Automatic Shutoff

The force gage 10 is designed to automatically turn off after a user selectable period of inactivity (i.e. a period of time during which no buttons are pressed). The user can set the period of time from 1, 5, 10, 20 and 30 minutes of inactivity or have the gage not shut off automatically.

3. Digital Filter

Four levels of filtering are available for both the displayed readings and peak readings. The filtering for peak readings affects the maximum peaks that will be recorded, while the filtering for the displayed readings affects how often the display will be updated.

The level of filtering required for peak readings is dependent on the nature of the test and the surrounding environment. If the capture of critical peak forces is required, as is the case in many laboratory tests, then the lowest filtering level is recommended. On the other hand, if the gage 10 is to be used in a mechanically or electrically noisy environment, then the highest level of filtering is recommended.

4. Printer and Computer Outputs

The force gage 10 is equipped with printer and computer outputs, allowing the user to connect the gage 10 to printer 84 or computer 86 for data acquisition. Using the Set-Up Menu, the user can enable or disable these outputs.

5. Calibration

To ensure accuracy in force measurement, the force gage 10 should be checked periodically to confirm that it is within tolerance. If the force gage 10 is used only as a noninterchangeable unit, i.e., only one force cell module 14A is used with only one force display module 12, then the complete unit may be calibrated using an auto-calibration method. Such calibration is done through use of the Set-Up Menu and is not explained in detail herein but the skilled artisan will appreciate the need for such periodic calibration.

If the force gage 10 is used in an interchangeable system, then auto-calibration is not recommended. This is because, when the force display module 12 is calibrated to one force cell module, it may not be calibrated to other force cell modules 14B–14E, thus preventing interchangeability.

6. Interchanging Force Cell Modules

The force gage 10 of the present invention permits the user with the unique opportunity to combine various capacity force cell modules 14A–14E with the force display module 12. The force display module 12 handles all control functions as well as user input via the buttons 32A, 32B, 32C and output via the display 28 and output interface connector 42. Each force cell module 14A–14E contains the load cell of a specific capacity (5, 10, 30, 50, 100 pounds) and a physical structure capable of withstanding large force loads. The force cell module communicates the applied forces to the force display module. The versatility of the force gage 10 is obtained through the interchangeability of the force cell modules. The five individual force cell modules 14A–14E of 5, 10, 30, 50, and 100 pounds may be alternatively combined with a single force display module 12.

Interchangeability between force cell modules 14A–14E is possible because all modules are calibrated to deliver an output that is within ±0.1% of a nominal value of 2.500 mV/V. Therefore, all that is required of the user is to attach the desired force cell module (14A–14E) to the force display module 12 and enter the capacity of the attached force cell module into the force display module via the Set-Up Menu.

The following steps are used to change the module 14A to a new force cell module (14B–14E):

1. Removing the screws 16A, 16B, 16C which connect the housings 22 and 46 of the gage 10.
2. Carefully pulling the force display module 12 and force cell module 14A apart.
3. Setting the force cell module 14A aside.
4. Choosing the desired force cell module (14B–14E).
5. Carefully aligning the connectors 40 and 66 and pressing the force display module 12 and the chosen desired force cell module (14B–14E) together.

6. Replacing the screws 16A, 16B, 16C.

The microprocessor 80 must then be adjusted to select the new load cell capacity using the following steps:

1. Entering the Set-Up Menu as previously described.
2. Scrolling through the menu until the load cell option is reached and pressing the PEAK/SELECT button 32B.
3. Using the ZERO/SCROLL button 32A to step through the choices and the PEAK/SELECT button 32B to select the proper load cell capacity.
4. Pressing the PEAK/SELECT button 32B to go back to the Set-Up Menu.

The gage 10 is now ready to be used with its new load cell module attached.

Figure 6:
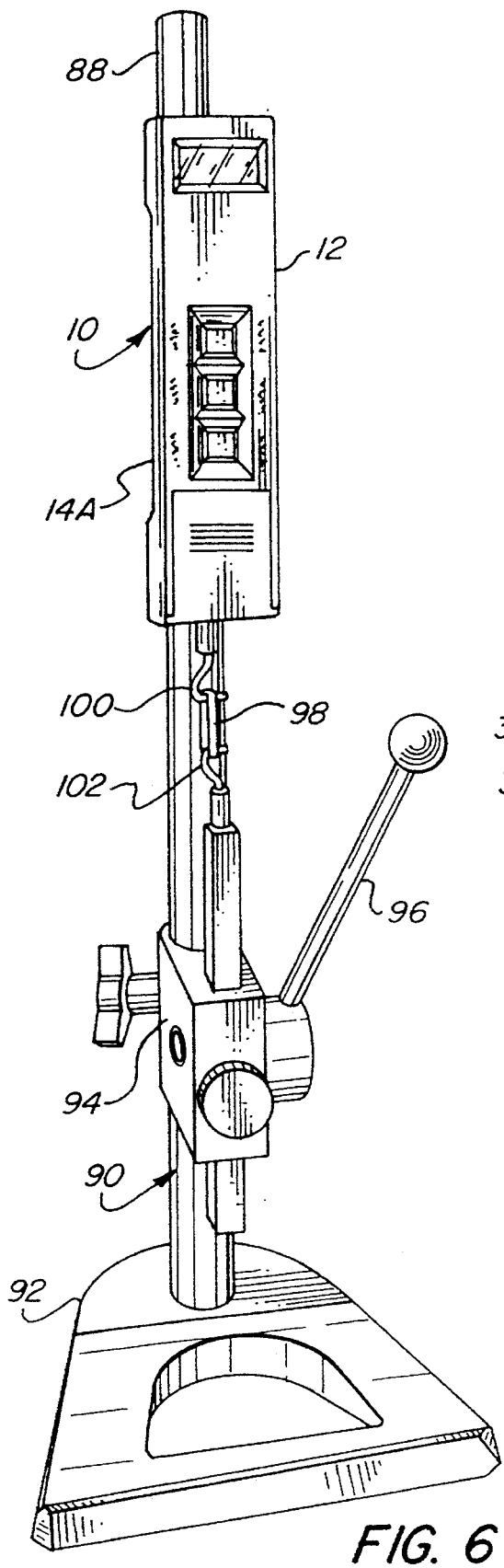
FIG. 6 is a perspective view of the digital electronic force gage of the present invention mounted vertically on a force test stand with an accessory hook attached to the force receiving member to perform a tensile force measuring test on a test sample.

In FIG. 6, the fully assembled digital electronic force gage 10 has been mounted vertically on a vertical post 88 of a typical force test stand 90. Appropriate screw threads (not shown) are provided on the force gage 10 for mounting to the test stand 90. The post 88 extends from a base 92 and has an elevating mechanism 94 mounted thereon. The elevating mechanism 94 is a rack and pinion drive mechanism for applying a force with a lever arm 96 while the digital electronic force gage 10 remains stationary to receive the applied tensile or compression forces. In the arrangement shown in FIG. 6, a test sample 98 is extended between an accessory hook 100 on the force receiving member 58 (FIG. 4) and an accessory hook 102 on the elevating mechanism 94 to perform a tensile force measuring test.

Figure 7:
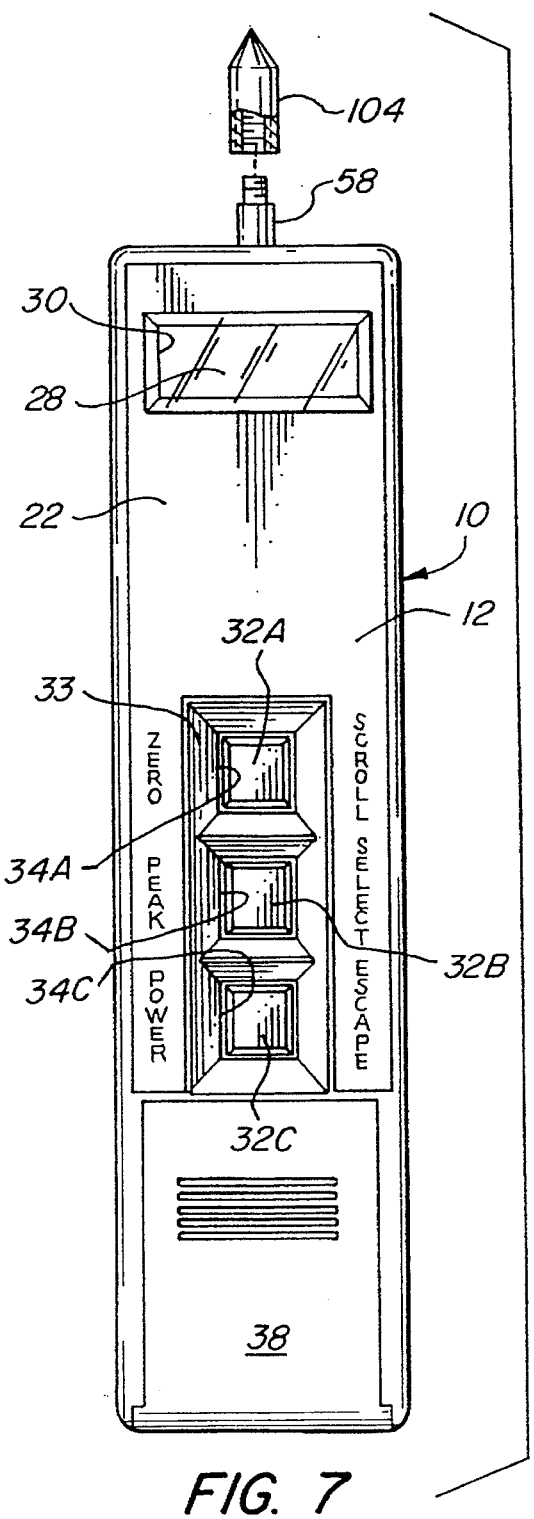
FIG. 7 is a front elevational view of the digital electronic force gage of the present invention illustrating the force receiving member pointing upward as it would in a hand-held application.

In FIG. 7, therein is illustrated another configuration of the force gage 10, with the force receiving member 58 pointing upwards as it would in a hand-held application. A conical tip accessory 104 attached to the force receiving member 58 illustrates a typical hand-held compression force measurement configuration of the force gage 10. With an accessory hook 100 (FIG. 6) attached to the force receiving member 58, substituted for the conical tip accessory 104, tensile forces may be measured.

To change the orientation of the force cell module 14A with the force receiving member 58 in the downward relationship to the force display module 12 as shown in FIGS. 1 and 2 to an upward relationship as shown in FIG. 7, the three screws 16A, 16B, 16C are removed and the force display module 12 and force cell module 14A are carefully pulled apart. After rotating force cell module 14A 180° relative to the force display module 12, the socket 68A can be aligned with the raised extension portion 70B so the screw 16B can be received through clearance hole 18A and in threaded hole 20B while the socket 68B aligns with the raised extension portion 70A so the screw 16A can be received through clearance hole 18B and in threaded hole 20A. Conveniently, an extra threaded hole 106 (FIG. 2) aligns with the clearance hole 18C to accept the screw 16C. Concurrently, as the force display module 12 and force cell module 14A are pressed back together, the male module interface connector 40 and the female module interface connector 66 are electrically connected therebetween. After the screws 16A, 16B, 16C are reinserted, the gage 10 is ready for operation.

As will be appreciated by the artisans skilled in the art, the self-contained digital electronic force gage with interchangeable force sensors of the present invention can be employed in a variety of force measuring applications.

It will, therefore, be seen from the above that my invention described above admirably achieves the objects of the invention. However, it will be appreciated that departures can be made by those skilled in the art without departing from the spirit and scope of the invention, which is limited only by the following claims.

Having thus described the invention, what is claimed is:

1. An electronic force gage for measuring tensile and compressive forces using various load cell capacities comprising:
   (a) a force display module freely interchangeable with various interchangeable load cells having different capacities, said force display module comprising:
      (i) a force display module housing forming an enclosure, and
      (ii) electronic control and processing circuit mounted within said enclosure of said force display module housing, said electronic control and processing circuit including means for receiving electronic signals corresponding with measured tensile and compressive forces from various interchangeable load cells having different capacities and processing said received signals into user usable electronic signals and means for alternatively selecting between the various load cell capacities; and
   (b) a force cell module releasably mounted to said force display module, said force cell module comprising:
      (i) a force cell housing releasable mounted to said force display module housing in abutting engagement to form an integral unit,
      (ii) a load cell mounted on the force cell housing thereby positioning said load cell in a generally fixed relationship with said force display module, said load cell corresponding to one of the various load cell capacities, said load cell including means for receiving the tensile and compressive forces to be measured and means for converting the measured tensile and compressive forces into corresponding electrical signals, and
      (iii) means for transmitting the electrical signals corresponding to the measured tensile and compressive forces to said means for receiving electronic signals of said electronic control and processing circuit of said force display module.

2. The electronic force gage for measuring tensile and compressive forces using various load cell capacities in accordance with claim 1, wherein said electronic control and processing circuit of said force display module further includes a user readable display for converting said user usable signals to a user readable format.

3. The electronic force gage for measuring tensile and compressive forces using various load cell capacities in accordance with claim 2, wherein said user readable display is a liquid crystal display.

4. The electronic force gage for measuring tensile and compressive forces using various load cell capacities in accordance with claim 2, wherein said user readable display includes means to indicate the various load cell capacities which can be used with said force display module, said indication means being responsive to said means for alternatively selecting between the various load cell capacities.

5. The electronic force gage for measuring tensile and compressive forces using various load cell capacities in accordance with claim 1, wherein said electronic control and processing circuit further includes means to indicate the various load cell capacities which can be used with said force display module, said indication means being responsive to said means for alternatively selecting between the various load cell capacities.

6. The electronic force gage for measuring tensile and compressive forces using various load cell capacities in accordance with claim 5, wherein said indication means is a user readable display.

7. The electronic force gage for measuring tensile and compressive forces using various load cell capacities in accordance with claim 6, wherein said user readable display is a liquid crystal display.

8. The electronic force gage for measuring tensile and compressive forces using various load cell capacities in accordance with claim 1, wherein said electronic control and processing circuit of said force display module further includes means for connecting to an auxiliary device for converting said user usable signals to a user readable format.

9. The electronic force gage for measuring tensile and compressive forces using various load cell capacities in accordance with claim 8, wherein said auxiliary device is a printer for recording said user usable signals.

10. The electronic force gage for measuring tensile and compressive forces using various load cell capacities in accordance with claim 8, wherein said auxiliary device is a computer for recording said user usable signals.

11. The electronic force gage for measuring tensile and compressive forces using various load cell capacities in accordance with claim 1, wherein said electronic control and processing circuit of said force display module further includes a self-contained power source mounted in said force display module housing.

12. The electronic force gage for measuring tensile and compressive forces using various load cell capacities in accordance with claim 1, wherein said means for alternatively selecting between the various load cell capacities includes a user engageable button.

13. The electronic force gage for measuring tensile and compressive forces using various load cell capacities in accordance with claim 1, wherein said load cell is a metal strain member with at least one strain gage attached thereto, said at least one strain gage is said means for converting the measured tensile and compressive forces into corresponding electrical signals.

14. The electronic force gage for measuring tensile and compressive forces using various load cell capacities in accordance with claim 13, wherein said load cell is mounted at one end of said force cell housing.

15. The electronic force gage for measuring tensile and compressive forces using various load cell capacities in accordance with claim 1, wherein said means for transmitting the electrical signals corresponding to the measured tensile and compressive forces to said means for receiving electronic signals of said electronic control and processing circuit of said force display module is an electrical connector centrally located on said force cell module to permit 180 degree rotation and reattachment of said force cell module on said force display module.

16. A kit for forming an electronic force gage for measuring tensile and compressive forces using various load cell capacities comprising:
  (a) a force display module freely interchangeable with various interchangeable load cells having different capacities, said force display module comprising:
    (i) a force display module housing forming an enclosure, and
    (ii) electronic control and processing circuit mounted within said enclosure of said force display module housing, said electronic control and processing circuit including means for receiving electronic signals corresponding with measured tensile and compressive forces from various interchangeable load cells having different capacities and processing said received signals into user usable electronic signals and means for alternatively selecting between the various load cell capacities; and
  (b) a plurality of force cell modules releasably and alternatively mountable to said force display module, each force cell module comprising:
    (i) a force cell housing releasable mountable to said force display module housing in abutting engagement to form an integral unit,
    (ii) a load cell mounted on the force cell housing thereby positioning said load cell in a generally fixed relationship to said force display module when the force cell housing is mounted on said force display housing, said load cell corresponding to one of the various load cell capacities, said load cell including means for receiving the tensile and compressive forces to be measured and means for converting the measured tensile and compressive forces into corresponding electrical signals, and
    (iii) means for transmitting the electrical signals corresponding to the measured tensile and compressive forces to said means for receiving electronic signals of said electronic control and processing circuit of said force display module.

17. The kit for forming an electronic force gage for measuring tensile and compressive forces using various load cell capacities in accordance with claim 16, wherein said electronic control and processing circuit of said force display module further includes a user readable display for converting said user usable signals to a user readable format.

18. The kit for forming an electronic force gage for measuring tensile and compressive forces using various load cell capacities in accordance with claim 17, wherein said user readable display is a liquid crystal display.

19. The kit for forming an electronic force gage for measuring tensile and compressive forces using various load cell capacities in accordance with claim 17, wherein said user readable display includes means to indicate the various load cell capacities which can be used with said force display module, said indication means being responsive to said means for alternatively selecting between the various load cell capacities.

20. The kit for forming an electronic force gage for measuring tensile and compressive forces using various load cell capacities in accordance with claim 16, wherein said electronic control and processing circuit further includes means to indicate the various load cell capacities which can be used with said force display module, said indication means being responsive to said means for alternatively selecting between the various load cell capacities.

21. The kit for forming an electronic force gage for measuring tensile and compressive forces using various load cell capacities in accordance with claim 20, wherein said indication means is a user readable display.

22. The kit for forming an electronic force gage for measuring tensile and compressive forces using various load cell capacities in accordance with claim 21, wherein said user readable display is a liquid crystal display.

23. The kit for forming an electronic force gage for measuring tensile and compressive forces using various load cell capacities in accordance with claim 16, wherein said electronic control and processing circuit of said force display module further includes means for connecting to an auxiliary device for converting said user usable signals to a user readable format.

24. The kit for forming an electronic force gage for measuring tensile and compressive forces using various load cell capacities in accordance with claim 23, wherein said auxiliary device is a printer for recording said user usable signals.

25. The kit for forming an electronic force gage for measuring tensile and compressive forces using various load cell capacities in accordance with claim 23, wherein said auxiliary device is a computer for recording said user usable signals.

26. The kit for forming an electronic force gage for measuring tensile and compressive forces using various load cell capacities in accordance with claim 16, wherein said electronic control and processing circuit of said force display module further includes a self-contained power source mounted in said force display module housing.

27. The kit for forming an electronic force gage for measuring tensile and compressive forces using various load cell capacities in accordance with claim 16, wherein said means for alternatively selecting between the various load cell capacities includes a user engageable button.

28. The kit for forming an electronic force gage for measuring tensile and compressive forces using various load cell capacities in accordance with claim 16, wherein said load cell is a metal strain member with at least one strain gage attached thereto, said at least one strain gage is said means for converting the measured tensile and compressive forces into corresponding electrical signals.

29. The kit for forming an electronic force gage for measuring tensile and compressive forces using various load cell capacities in accordance with claim 28, wherein said load cell is mounted at one end of said force cell housing.

30. The kit for forming an electronic force gage for measuring tensile and compressive forces using various load cell capacities in accordance with claim 16, wherein said means for transmitting the electrical signals corresponding to the measured tensile and compressive forces to said means for receiving electronic signals of said electronic control and processing circuit of said force display module is an electrical connector centrally located on each of said force cell modules to permit 180 degree rotation and reattachment of each of said force cell modules on said force display module.

31. A method of assembling an electronic force gage for measuring tensile and compressive forces using various load cell capacities comprising the steps of:
  (a) providing a force display module freely interchangeable with various interchangeable load cells of different capacities, said force display module comprising:
    (i) a force display module housing forming an enclosure, and
    (ii) electronic control and processing circuit mounted within said enclosure of said force display module housing, said electronic control and processing circuit including means for receiving electronic signals corresponding with measured tensile and compressive forces from various interchangeable load cells having different capacities and processing said received signals into user usable electronic signals and means for alternatively selecting between the various load cell capacities;
  (b) providing a force cell module releasably mountable to said force display module, said force cell module comprising:
    (i) a force cell housing releasably mounted to said force display module housing in abutting engagement to form an integral unit,
    (ii) a load cell mounted on the force cell housing and corresponding to one of the various load cell capacities, the load cell including means for receiving the tensile and compressive forces to be measured and means for converting the measured tensile and compressive forces into corresponding electrical signals, and
    (iii) means for transmitting the electrical signals corresponding to the measured tensile and compressive forces to said means for receiving electronic signals of said electronic control and processing circuit of said force display module;
  (c) mounting said force cell module to said force display module thereby positioning said load cell in a generally fixed relationship to said force display module; and
  (d) utilizing said means for alternatively selecting between the various load cell capacities to select the load cell capacity of said force cell module from among the various load cell capacities.

32. The method for forming an electronic force gage for measuring tensile and compressive forces using various load cell capacities in accordance with claim 31, wherein said electronic control and processing circuit of said force display module further includes a user readable display for converting said user usable signals to a user readable format.

33. The method for forming an electronic force gage for measuring tensile and compressive forces using various load cell capacities in accordance with claim 32, wherein said user readable display is a liquid crystal display.

34. The method for forming an electronic force gage for measuring tensile and compressive forces using various load cell capacities in accordance with claim 32, wherein said user readable display includes means to indicate the various load cell capacities which can be used with said force display module, said indication means being responsive to said means for alternatively selecting between the various load cell capacities.

35. The method for forming an electronic force gage for measuring tensile and compressive forces using various load cell capacities in accordance with claim 31, wherein said electronic control and processing circuit further includes means to indicate the various load cell capacities which can be used with said force display module, said indication means being responsive to said means for alternatively selecting between the various load cell capacities.

36. The method for forming an electronic force gage for measuring tensile and compressive forces using various load cell capacities in accordance with claim 35, wherein said indication means is a user readable display.

37. The method for forming an electronic force gage for measuring tensile and compressive forces using various load cell capacities in accordance with claim 36, wherein said user readable display is a liquid crystal display.

38. The method for forming an electronic force gage for measuring tensile and compressive forces using various load cell capacities in accordance with claim 31, wherein said electronic control and processing circuit of said force display module further includes means for connecting to an auxiliary device for converting said user usable signals to a user readable format.

39. The method for forming an electronic force gage for measuring tensile and compressive forces using various load cell capacities in accordance with claim 38, wherein said auxiliary device is a printer for recording said user usable signals.

40. The method for forming an electronic force gage for measuring tensile and compressive forces using various load cell capacities in accordance with claim 38, wherein said auxiliary device is a computer for recording said user usable signals.

41. The method for forming an electronic force gage for measuring tensile and compressive forces using various load cell capacities in accordance with claim 31, wherein said electronic control and processing circuit of said force display module further includes a self-contained power source mounted in said force display module housing.

42. The method for forming an electronic force gage for measuring tensile and compressive forces using various load cell capacities in accordance with claim 31, wherein said means for alternatively selecting between the various load cell capacities includes a user engageable button.

43. The method for forming an electronic force gage for measuring tensile and compressive forces using various load cell capacities in accordance with claim 31, wherein said load cell is a metal strain member with at least one strain gage attached thereto, said at least one strain gage is said means for converting the measured tensile and compressive forces into corresponding electrical signals.

44. The method for forming an electronic force gage for measuring tensile and compressive forces using various load cell capacities in accordance with claim 43, wherein said load cell is mounted at one end of said force cell housing.

45. The method for forming an electronic force gage for measuring tensile and compressive forces using various load cell capacities in accordance with claim 31, wherein said means for transmitting the electrical signals corresponding to the measured tensile and compressive forces to said means for receiving electronic signals of said electronic control and processing circuit of said force display module is an electrical connector centrally located on said force cell module to permit 180 degree rotation and reattachment of said force cell module on said force display module.

46. The electronic force gage for measuring tensile and compressive forces using various load cell capacities in accordance with claim 1, wherein said means for receiving the tensile and compressive forces to be measured includes a force receiving member which extends from said load cell through the force cell housing.

47. The kit for forming an electronic force gage for measuring tensile and compressive forces using various load cell capacities in accordance with claim 16, wherein said means for receiving the tensile and compressive forces to be measured includes a force receiving member which extends from said load cell through the force cell housing.

48. The kit for forming an electronic force gage for measuring tensile and compressive forces using various load cell capacities in accordance with claim 16, wherein said plurality of load cells provide substantially equivalent millivolt outputs to said electronic control and processing circuit thereby facilitating rapid and convenient interchangeability.

49. The method for forming an electronic force gage for measuring tensile and compressive forces using various load cell capacities in accordance with claim 31, wherein said means for receiving the tensile and compressive forces to be measured includes a force receiving member which extends from said load cell through the force cell housing.

* * * * *